(12) United States Patent
    Sekimoto et al.

(10) Patent No.: US 10,295,783 B2
(45) Date of Patent: May 21, 2019

(54) CAMERA MODULE

(71) Applicant: Sharp Kabushiki Kaisha, Sakai, Osaka (JP)

(72) Inventors: Yoshihiro Sekimoto, Sakai (JP); Norimichi Shigemitsu, Sakai (JP); Tetsuya Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/518,775

(22) PCT Filed: Aug. 26, 2015

(86) PCT No.: PCT/JP2015/074120
    § 371 (c)(1),
    (2) Date: Apr. 13, 2017

(87) PCT Pub. No.: WO2016/067731
    PCT Pub. Date: May 6, 2016

(65) Prior Publication Data
    US 2017/0235095 A1    Aug. 17, 2017

(30) Foreign Application Priority Data

Oct. 27, 2014   (JP) .................................. 2014-218677
Apr. 1, 2015    (JP) .................................. 2015-075438

(51) Int. Cl.
    *G02B 7/02*    (2006.01)
    *G02B 7/09*    (2006.01)
    (Continued)

(52) U.S. Cl.
    CPC ............... *G02B 7/09* (2013.01); *G02B 7/021* (2013.01); *G02B 7/08* (2013.01); *G02B 27/646* (2013.01);
    (Continued)

(58) Field of Classification Search
    CPC ... G11B 7/0908; G11B 7/0925; G11B 7/0927; G11B 7/0937; G11B 7/023; G11B 7/04; H02K 41/0356
    (Continued)

(56) References Cited

U.S. PATENT DOCUMENTS

2011/0267692 A1    11/2011    Watanabe et al.
2011/0310500 A1    12/2011    Osaka et al.
(Continued)

FOREIGN PATENT DOCUMENTS

JP    2005-352031 A    12/2005
JP    2007-047683 A    2/2007
(Continued)

OTHER PUBLICATIONS

Official Communication issued in International Patent Application No. PCT/JP2015/074120, dated Dec. 1, 2015.

*Primary Examiner* — William Choi
(74) *Attorney, Agent, or Firm* — Keating & Bennett, LLP

(57) ABSTRACT

Provided is a camera module that is capable of driving with low power consumption and is small-sized and thin even in a case of having high resolution. A movable portion (4) provided in a lens driving device (9) of a camera module (20) has a shape that covers an upper side of a fixed lens (1b) and at least a part of a side part (side surface) of the fixed lens (1b).

8 Claims, 17 Drawing Sheets

(51) Int. Cl.
　　*G02B 27/64*　　　(2006.01)
　　*G02B 7/08*　　　　(2006.01)
　　*H04N 5/225*　　　(2006.01)
　　*H04N 5/232*　　　(2006.01)
　　*G02B 13/00*　　　(2006.01)

(52) U.S. Cl.
　　CPC ......... *H04N 5/2254* (2013.01); *H04N 5/2257* (2013.01); *H04N 5/23212* (2013.01); *G02B 13/0045* (2013.01)

(58) Field of Classification Search
　　USPC .................. 359/811, 819, 822, 823, 824
　　See application file for complete search history.

(56) References Cited

U.S. PATENT DOCUMENTS

| | | | |
|---|---|---|---|
| 2013/0258140 A1* | 10/2013 | Lipson | ............... G03B 3/10 348/240.3 |
| 2013/0314810 A1 | 11/2013 | Sekimoto et al. | |

FOREIGN PATENT DOCUMENTS

| | | | |
|---|---|---|---|
| JP | 2009-104082 A | | 5/2009 |
| JP | 2011-099901 A | | 5/2011 |
| JP | 2011-118334 A | | 6/2011 |
| JP | 2011-133777 A | | 7/2011 |
| JP | 2012-003002 A | | 1/2012 |
| JP | 2012-150234 A | | 8/2012 |
| JP | 2012150234 A | * | 8/2012 |
| JP | 2012-256017 A | | 12/2012 |
| JP | 2013-200459 A | | 10/2013 |
| JP | 2014-078139 A | | 5/2014 |

* cited by examiner

1a: MOVABLE LENS
1b: FIXED LENS
3: SUBSTRATE
4: MOVABLE PORTION
4a: LENS HOLDING PORTION
4b: SIDE PORTION
5: BALL
6: FIXED PORTION
7: PERMANENT MAGNET
8: COIL
9: LENS DRIVING DEVICE
20: CAMERA MODULE

1a: MOVABLE LENS
1b: FIXED LENS
3: SUBSTRATE
4: MOVABLE PORTION
4a: LENS HOLDING PORTION
4b: SIDE PORTION
5: BALL
6: FIXED PORTION
7: PERMANENT MAGNET
8: COIL
9: LENS DRIVING DEVICE
10: IMAGE SENSOR
11: SENSOR COVER
12: IR-CUT FILTER
13: MAGNETIC BODY
20: CAMERA MODULE

1a: MOVABLE LENS
1b': FIXED LENS
3: SUBSTRATE
4': MOVABLE PORTION
4a: LENS HOLDING PORTION
4b: SIDE PORTION
5: BALL
6: FIXED PORTION
7: PERMANENT MAGNET
8: COIL
9': LENS DRIVING DEVICE
10: IMAGE SENSOR
11': SENSOR COVER
11a': STEPPED PART
12: IR-CUT FILTER
13: MAGNETIC BODY
30: CAMERA MODULE

1a: MOVABLE LENS
1b': FIXED LENS
3: SUBSTRATE
4": MOVABLE PORTION
4a: LENS HOLDING PORTION
4e: SIDE PORTION
6: FIXED PORTION
7: PERMANENT MAGNET
8: COIL
9": LENS DRIVING DEVICE
10: IMAGE SENSOR
11': SENSOR COVER
11a': STEPPED PART
12: IR-CUT FILTER
14a: PLATE SPRING
14b: PLATE SPRING
40: CAMERA MODULE

1a: MOVABLE LENS
1b': FIXED LENS
3: SUBSTRATE
4': MOVABLE PORTION
4a: LENS HOLDING PORTION
4b: SIDE PORTION
5: BALL
6: FIXED PORTION
7: PERMANENT MAGNET
8: COIL
9': LENS DRIVING DEVICE
10: IMAGE SENSOR
11": SENSOR COVER
11a": STEPPED PART
12: IR-CUT FILTER
13: MAGNETIC BODY
50: CAMERA MODULE

1a: MOVABLE LENS
1b"": FIXED LENS
2: COVER
3: SUBSTRATE
4"": MOVABLE PORTION
6: FIXED PORTION
6b: MOUNTING SURFACE
7: PERMANENT MAGNET
8a: AF COIL
8b: OIS COIL
9"": LENS DRIVING DEVICE
10: IMAGE SENSOR
12: IR-CUT FILTER
14a, 14b: PLATE SPRING
15: LENS BARREL
16: ADHESIVE
17: AF MOVABLE PORTION
18: OIS MOVABLE PORTION
19: SUSPENSION WIRE
80: CAMERA MODULE

1a: MOVABLE LENS
6: FIXED PORTION
7: PERMANENT MAGNET
8a: AF COIL
8b: OIS COIL
9'''': LENS DRIVING DEVICE
14a: PLATE SPRING
14c: EXTENDING PART
15: LENS BARREL
19: SUSPENSION WIRE
80: CAMERA MODULE

1a: MOVABLE LENS
1b"": FIXED LENS
2: COVER
3: SUBSTRATE
4"": MOVABLE PORTION
6: FIXED PORTION
6b: MOUNTING SURFACE
7: PERMANENT MAGNET
8a: AF COIL
8b: OIS COIL
9"": LENS DRIVING DEVICE
10: IMAGE SENSOR
12: IR-CUT FILTER
14a,14b : PLATE SPRING
15: LENS BARREL
16: ADHESIVE
17: AF MOVABLE PORTION
18: OIS MOVABLE PORTION
19: SUSPENSION WIRE
90: CAMERA MODULE

CAMERA MODULE

TECHNICAL FIELD

The present invention relates to a camera module that is mounted on an electronic apparatus such as a mobile phone, and, particularly, to a camera module that includes an autofocus function and an image stabilizer function and that realizes reduction in weight of a movable portion for achieving such an autofocus function and an image stabilizer function and reduction in thickness of the module.

BACKGROUND ART

In recent years, most of electronic apparatuses such as mobile phones have a camera module mounted thereon, and, among them, many of cameras for front-side photographing have an autofocus function mounted thereon. The autofocus function is a function with which an imaging lens is displaced in accordance with a distance to an object and is focused on the object, and a camera module is provided with a lens driving device in order to realize such an autofocus function.

Examples of the types of lens driving devices include various types such as a type using a stepper motor, a type using a piezoelectric element, and a type using a VCM (Voice Coil Motor), which have already been distributed on the market. Among them, the lens driving devices of the type using a VCM are comparatively inexpensive and highly reliable, and therefore occupy an overwhelming majority in a field of the camera modules having the autofocus function.

Furthermore, a camera module that is provided with an image stabilizer function in addition to the autofocus function has been recognized in the market in recent years. As a device that drives an imaging lens for image stabilization, such a driving device that includes the VCM is also the mainstream, and a lens driving device that drives an imaging lens in three-axis directions for the autofocus function and the image stabilizer function has been proposed.

On the other hand, in a field of camera modules, there is always a demand for increasing the number of pixels in order to obtain an image having higher resolution, and there is a tendency to increase the number of pixels for satisfying such a demand. Accordingly, a diameter of an imaging lens tends to become larger, and the imaging lens tends to be heavier. However, a small size, light weight, low power consumption, and the like are important key words at the same time for a small-sized mobile apparatus such as a mobile phone, and therefore it is difficult to synergistically increase the size of a lens driving device just because the lens driving device drives the large and heavy imaging lens. Furthermore, since priority is put on securing a space in which a display panel such as a liquid crystal display panel, which is larger, and a battery having higher capacity are arranged, there has been an increase in the number of cases where size reduction and thickness reduction of a camera module are desired more than ever.

Each of PTLs 1 and 2 describes a conventional camera module that is provided with a movable portion including an imaging lens which is driven for realizing the autofocus function. PTL 3 describes a conventional camera module that is also provided with the image stabilizer function in addition to the autofocus function.

On the other hand, PTL 4 proposes a conventional camera module that has a configuration in which, in order to reduce weight of a movable portion including imaging lenses which are driven for realizing the autofocus function, the imaging lenses are divided into two groups, and some of the lenses are set to be fixed lenses and only the remaining lens is driven. In the camera module disclosed in PTL 4, a lens that is closest to an image and a lens that is closest to an object are the fixed lenses, and the autofocus function is realized by driving a lens between the fixed lenses. A system in which a lens or a lens group, which is arranged on an inner side, is driven to realize a focusing operation as described above is referred to as an inner focus system. For the camera module disclosed in PTL 4, a case is described where an ultrasonic linear actuator referred to as an SIDM (Smooth Impact Drive Mechanism: registered trademark) is used as a lens driving device for driving such a lens (inner lens) arranged on an inner side. In addition, though it is suggested that a VCM (voice coil motor) is used, a specific configuration thereof is not described.

CITATION LIST

Patent Literature

PTL 1: Japanese Unexamined Patent Application Publication No. 2012-3002 (published on Jan. 5, 2012)
PTL 2: Japanese Unexamined Patent Application Publication No. 2007-47683 (published on Feb. 22, 2007)
PTL 3: Japanese Unexamined Patent Application Publication No. 2012-256017 (published on Dec. 27, 2012)
PTL 4: Japanese Unexamined Patent Application Publication No. 2013-200459 (published on Oct. 3, 2013)

SUMMARY OF INVENTION

Technical Problem

However, in a configuration of each of the aforementioned camera modules described in PTLs 1 and 2, reduction in weight, for example, by dividing imaging lenses into two groups, of the movable portion including the imaging lens which is driven for realizing the autofocus function is not achieved, and thus it is difficult to realize a camera module, which has low power consumption, with such a configuration.

Moreover, also in the configuration of the camera module described in PTL 3, such configuration is described in which the entirety of imaging lenses is driven in order to realize the autofocus function and the image stabilizer function, and thus, similarly, reduction in weight of a movable portion is not achieved and it is difficult to realize a camera module which has low power consumption. Further, a lens driving device is simply mounted on a sensor cover that protects an image sensor, and therefore it is also difficult to reduce thickness of the camera module.

On the other hand, PTL 4 describes the camera module having a configuration in which a piezoelectric element expands and contracts in accordance with a given drive signal, a driving shaft is oscillated in a shaft direction in accordance with the expansion and contraction, and a movable member that is frictionally engaged with the driving shaft is slid only in a desired direction, but the movable member is not formed by taking reduction in thickness of the camera module into consideration, and therefore it is difficult to realize a camera module, thickness of which is reduced, with such a configuration.

An object of the invention is to provide a camera module that is capable of driving with low power consumption and is small-sized and thin, even in a case of having high resolution.

Solution to Problem

In order to solve the aforementioned problems, a camera module of the invention is a camera module including: imaging lenses; a lens driving device that drives the imaging lenses; and an image sensor that converts light entering the image sensor via the imaging lenses into an electrical signal, in which the imaging lenses include at least a movable lens that is driven for autofocus and a fixed lens that is not driven, the fixed lens is arranged under the movable lens and on a side closer to the image sensor, the lens driving device includes a movable portion including the movable lens and a fixed portion that drives the movable portion including the movable lens, the movable portion has a shape that covers an upper side of the fixed lens and at least a part of a side surface of the fixed lens, and at least a part of the fixed portion is provided at the side surface of the fixed lens.

With the aforementioned configuration, the movable portion of the lens driving device has the shape that covers the upper side of the fixed lens and at least a part of the side surface of the fixed lens, and at least a part of the fixed portion of the lens driving device is provided at the side surface of the fixed lens, and therefore it is possible to realize a small-sized and thin camera module. Moreover, since the configuration includes the movable lens and the fixed lens, even in a case where, in order to obtain high resolution, the number of pixels is increased and a diameter of an imaging lens becomes larger, driving is able to be performed with low power consumption.

Advantageous Effects of Invention

According to an aspect of the invention, it is possible to realize a camera module that is capable of driving with low power consumption and is small-sized and thin even in a case of having high resolution.

DESCRIPTION OF EMBODIMENTS

Hereinafter, embodiments of the invention will be described in detail on the basis of drawings. However, dimensions, materials, shapes, relative arrangement, and the like of components described in the embodiments are merely exemplary embodiments, and do not intend to restrict the scope of the invention.

Embodiments of the invention will be described on the basis of FIG. 1 to FIG. 19 as follows.

Embodiment 1

Hereinafter, an embodiment of the invention will be described on the basis of FIG. 1 to FIG. 4.

(Overview of Camera Module)

Figure 1:
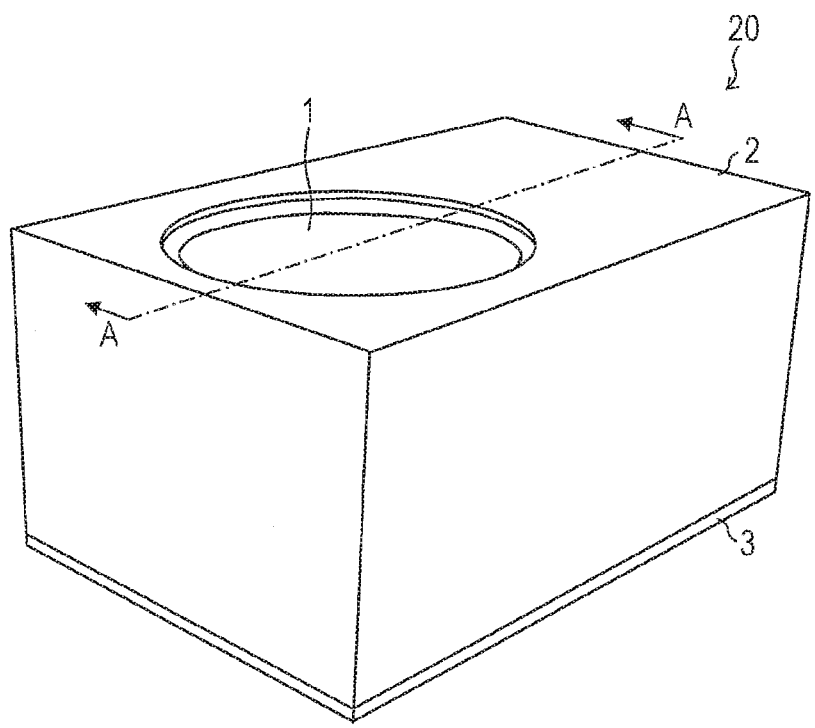
FIG. 1 is a perspective view illustrating a schematic configuration of a camera module according to an embodiment of the invention.

FIG. 1 is a perspective view illustrating a schematic configuration of a camera module 20.

As illustrated in the figure, the camera module 20 is provided with imaging lenses 1, a cover 2 that accommodates, in the inside thereof, a lens driving device (not illustrated) which is arranged outside the imaging lenses 1 for driving the imaging lenses 1 in an optical axis direction, and a substrate 3 on which an image sensor (not illustrated), the lens driving device (not illustrated), and the cover 2 are mounted. Note that, in the description below, a side of the imaging lenses 1 (object side) is referred to as an upper side and a side of the substrate 3 is referred to as a lower side, for convenience.

(Lens Driving Device)

Figure 2:
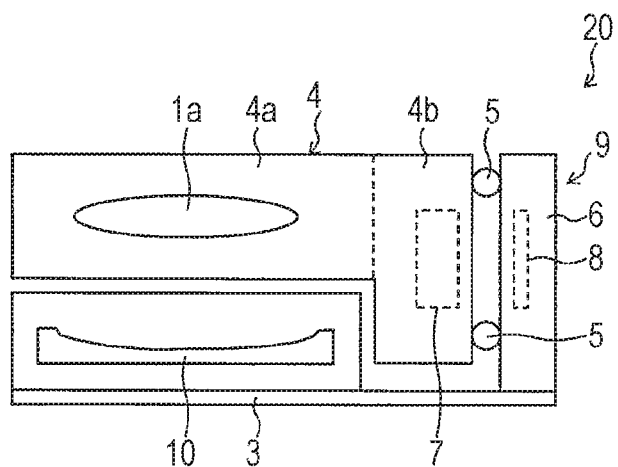
FIG. 2 is a schematic side view for explaining a lens driving device of the camera module illustrated in FIG. 1.

FIG. 2 is a schematic side view for explaining a lens driving device 9 of the camera module 20. Note that, since FIG. 2 is the schematic side view, illustration of the image sensor, a sensor cover, and the like is omitted.

The imaging lenses 1 illustrated in FIG. 1 include a movable lens 1*a* that is driven for autofocus and a fixed lens 1*b* that is not driven. Each of the movable lens 1*a* and the fixed lens 1b which are illustrated may be composed of one lens or may be composed of a plurality of lenses. Note that, in the present embodiment, as the fixed lens 1b, one that has a shape in which an upper surface that is on the object side is a concave surface and a lower surface that is on the substrate side is a flat surface is used, which will be described in detail below.

The movable lens 1a is mounted on a movable portion 4 which is provided in the lens driving device 9. In the present embodiment, one that is formed into a substantially angled shape (L shape) in side view is used for the movable portion 4, and the movable portion 4 is constituted by a lens holding portion 4a that is positioned above the fixed lens 1b and a side portion 4b that is connected to the lens holding portion 4a and extends to a side part of the fixed lens 1b. Note that, the shape of the movable portion 4 is not limited thereto, as long as the shape covers an upper side of the fixed lens 1b and at least a part of the side part (side surface) of the fixed lens 1b.

The side portion 4b is guided by balls 5 so as to be movable in an optical axis direction (longitudinal direction of the figure) with respect to a fixed portion 6. In the present embodiment, in a case where a permanent magnet 7 is fixed to the side portion 4b and a coil 8 is fixed to the fixed portion 6, when an electric current is applied to the coil 8, the movable portion 4 including the movable lens 1a is driven with respect to the fixed portion 6, but there is no limitation thereto, and the coil 8 and the permanent magnet 7 may be fixed to the side portion 4b and the fixed portion 6, respectively.

As described above, the lens driving device 9 is provided with the movable portion 4, the balls 5, the fixed portion 6, the permanent magnet 7, and the coil 8.

Note that, in the present embodiment, the balls 5 are used in order to guide the side portion 4b so as to be movable in the optical axis direction with respect to the fixed portion 6, but there is no limitation thereto, and the movable portion 4 may be supported by a spring or the like. In this manner, by constituting the imaging lenses 1 by two groups and setting one as the movable lens 1a and the other as the fixed lens 1b, it is possible to reduce weight of the movable lens 1a and realize the camera module 20 that is capable of driving with low power consumption.

Moreover, as illustrated in FIG. 2, in a case where the fixed lens 1b whose lower surface is the flat surface is arranged in proximity to the image sensor (not illustrated) which is on the substrate 3, the fixed lens 1b is to be arranged in a space corresponding to a distance (referred to as flange back) from a lower end of a lens to an image sensor of a case of one group lens (a case where an imaging lens is constituted only by a movable lens), so that it is desirable that a distance from the image sensor to a lower end of the movable lens 1a is larger than the flange back of the case of one group lens. Therefore, in a case where it is desired to suppress height of the entirety of the camera module, it is assumed that thickness of the lens holding portion 4a that holds the movable lens 1a becomes considerably thin. Accordingly, it is extremely difficult to arrange a driving portion (for example, the permanent magnet, the coil, and the like) only within a range of the thickness of the lens holding portion 4a that is brought into an extremely thin state, and when an extremely thin member is guided so as to be movable in a direction of the thickness thereof, tilt may be caused to be large. Thus, in the present embodiment, by setting the shape of the movable portion 4 to be the angled shape and providing at least a part of the driving portion (for example, the permanent magnet, the coil, and the like) and guiding means (for example, the balls or the like) in the side portion 4b of the movable portion 4, which is a portion whose thickness is secured in the side part of the fixed lens 1b, a driving force is secured and tilt is reduced. Considering that, in a lens driving device using an ultrasonic linear actuator, a piezoelectric element serving as a driving source is expensive, hysteresis is generated at a time of driving, driving sound is loud, and the like, the lens driving device of the type using the VCM (Voice Coil Motor) is used in the present embodiment, but there is no limitation thereto, and various types of lens driving devices may be used.

(Shape of Fixed Lens)

As illustrated in FIG. 2, in the fixed lens 1b, the object surface side is the concave surface and the image surface side (surface on a side of the image sensor not illustrated) is the flat surface. However, the flat surface is not necessarily exactly flat, and minute unevenness (for example, on a nm order) that reduces a reflectance of light may be formed, or the flat surface may be slightly curved. The shape of the fixed lens 1b is not limited thereto.

Note that, FIG. 2 illustrates a case where a size of an external form of the image surface side of the fixed lens 1b and a size of an external form of the object surface side are the same, but there is no limitation thereto, and the size of the external form of the image surface side of the fixed lens 1b and the size of the external form of the object surface side thereof may be different. Since the image surface side of the fixed lens 1b is arranged in proximity to the image sensor, the size thereof may be formed so as to be equivalent to that of an imaging region of the image sensor. In addition, the shape of the fixed lens 1b is not necessarily circular, and may be a rectangular shape similarly to the image sensor.

Note that, a flange part may be sufficiently formed on the object side of the fixed lens 1b. By differentiating shapes between the object side and the image surface side, a step may be provided to be used as a positioning portion at a time of attachment to the sensor cover or the like, which will be described below. However, in the fixed lens 1b, it is desired to reduce as much as possible, for example, by D-cut, the flange part on a side, in which the lens driving device 9, more specifically, the side portion 4b of the movable portion 4 or the fixed portion 6 of the lens driving device 9 is arranged, and description thereof will be described below.

Moreover, the object side of the fixed lens 1b may have a circular shape, and the image surface side may be a rectangle that is smaller than the circle. By using such shapes, various advantages are caused such that a stepped structure is able to be formed at a time of attachment to the sensor cover and, by using a space generated due to a difference in sizes of the circle and the rectangle, wire bonding for electric conduction of the image sensor is able to be performed.

Hereinafter, description will be given for a reason why the fixed lens 1b whose object surface side is the concave surface and whose image surface side (surface on the side of the image sensor not illustrated) is the flat surface is used in the present embodiment.

Each of the fixed lenses disclosed in PTL 4 (Japanese Unexamined Patent Application Publication No. 2013-200459) described above has a shape in which an object surface side has a convex shape and a surface on an image side is a surface that has a concave in the center thereof and has an inflection point. Since the fixed lens has such a shape, in a case where reduction in thickness of the camera module is attempted by widening an angle, it is difficult to correct an aberration sufficiently, resulting in that it is difficult to reduce the thickness of the camera module.

On the other hand, the applicants of the present application propose a shape of a fixed lens, in which an object surface side is a concave surface and an image surface side is a flat surface and which is different from that of the fixed lens of PTL 4 above (Japanese Patent Application No. 2014-78139). In a case where a fixed lens having such a shape is used, even when reduction in height of a camera module is attempted by arranging the fixed lens in proximity to an image sensor for designing a lens having a wide angle and thereby reducing a focal distance and an optical length, it is possible to effectively correct an aberration, thus making it possible to prevent imaging performance from being deteriorated, specifically, resolution from being deteriorated due to widening the angle. However, due to reduction in thickness by reducing the focal distance and the optical length, a region for a movable lens becomes narrow, so that a configuration of a lens driving device for driving the movable lens is to be restricted. Accordingly, in the present embodiment, the movable portion 4 having the angled shape is used with the fixed lens 1b in which the object surface side is the concave surface and the image surface side is the flat surface.

(Configuration of Camera Module)

Hereinafter, a configuration of the camera module will be described with use of FIG. 3 and FIG. 4.

Figure 3:
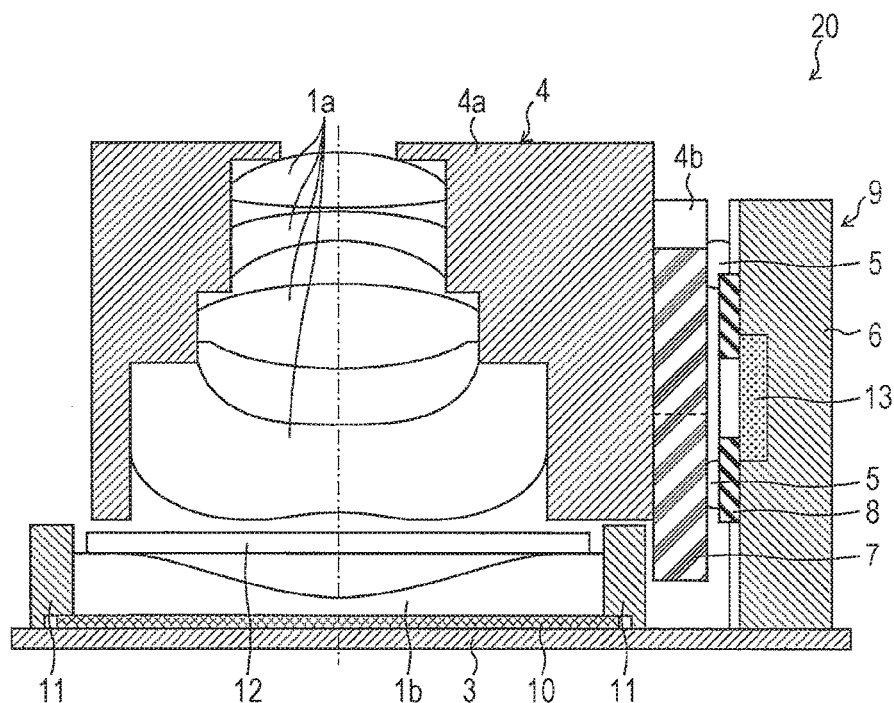
FIG. 3 is a sectional view taken along an A-A line illustrated in FIG. 1, which illustrates a state where a cover is removed.
Figure 4:
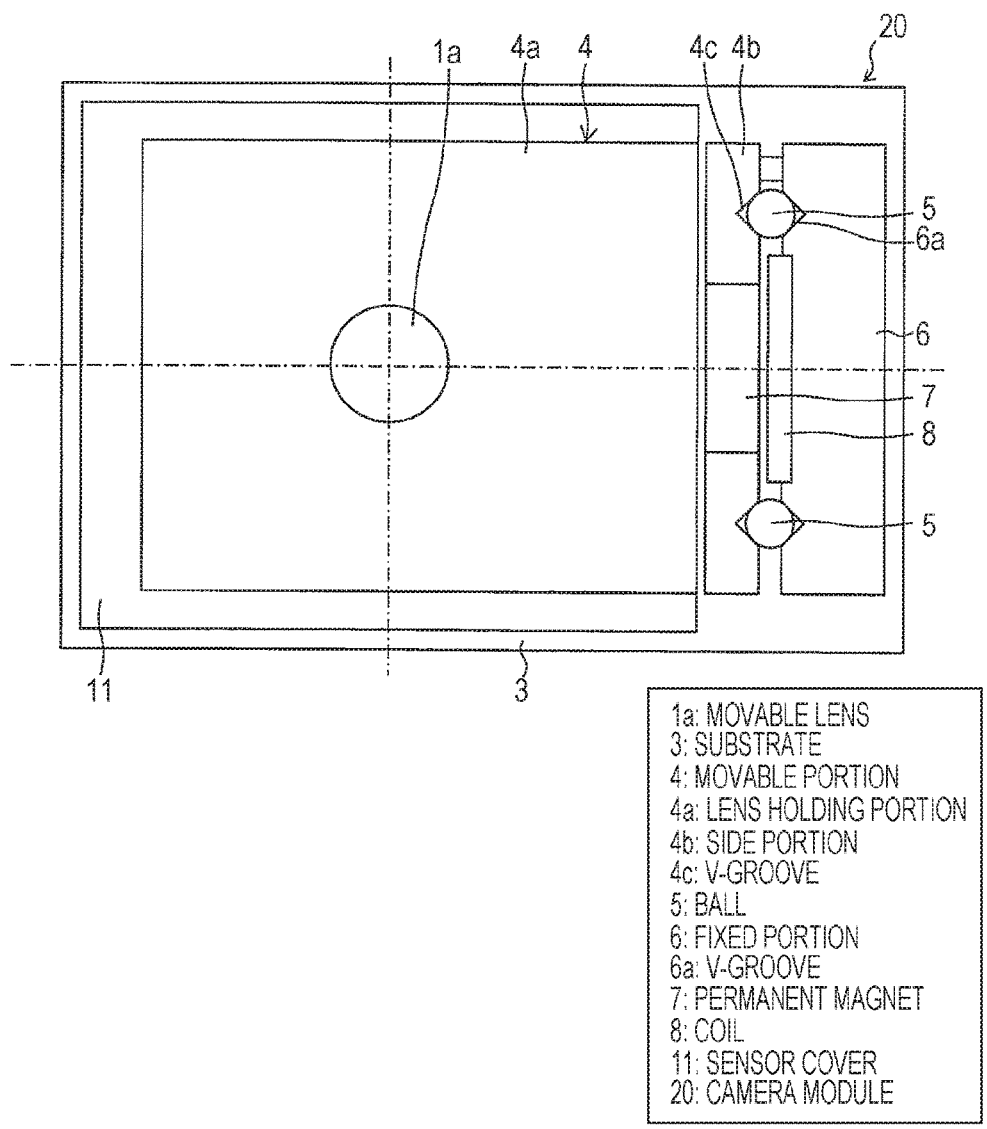
FIG. 4 is a top view of the camera module illustrated in FIG. 1, which illustrates the state where the cover is removed.

FIG. 3 is a sectional view taken along an A-A line illustrated in FIG. 1, and FIG. 4 is a top view of the camera module illustrated in FIG. 1. Note that, illustration of the cover is omitted in FIG. 3 and FIG. 4.

As illustrated in FIG. 3, the movable lens 1a constituted by a group of four lenses is used in the present embodiment, but the number of lenses is not limited to four, and may be three or less and may be five or more. The movable lens 1a is fixed inside the lens holding portion 4a of the movable portion 4.

The fixed lens 1b is arranged under the movable lens 1a and on a side closer to the image sensor 10. The fixed lens 1b is fixed to a sensor cover 11 in the present embodiment. Specifically, a part of the sensor cover 11 is in contact with the image sensor 10 so that a position is determined (height is determined), and the fixed lens 1b is fixed to the sensor cover 11 so as to have a slight gap (not illustrated) between the fixed lens 1b and the image sensor 10. With such a configuration, even in a case where the image sensor 10 is curved, the fixed lens 1b is able to be fixed without being affected by the curve, so that it is possible to reduce optical tilt. However, in a case of desiring to have priority on accuracy of positioning of height in the optical direction (longitudinal direction of the figure), the fixed lens 1b may be directly mounted on the image sensor 10 as described below.

The image sensor 10 is mounted on the substrate 3. In order to have priority on contact between the image sensor 10 and the sensor cover 11, there is a slight gap between the substrate 3 and the sensor cover 11, which is filled with an adhesive.

In an IR-cut filter 12, a film having an IR-cut function is formed on a surface of a glass plate, and an antireflection film is formed together in some cases. The IR-cut filter 12 is arranged between the movable lens 1a and the fixed lens 1b, and mounted on the fixed lens 1b. That is, the IR-cut filter 12 is not driven by the lens driving device 9. By arranging the fixed lens 1b in a space between the IR-cut filter 12 and the image sensor 10, it is possible to effectively utilize a part which was a cavity conventionally. The IR-cut filter 12 is provided in order to reduce also an influence of reflection of foreign matter on the image sensor 10 as well. In order to reduce the influence, it is desirable that a distance between the IR-cut filter 12 and the image sensor 10 is increased, and it is desirable that the IR-cut filter 12 is provided above the fixed lens 1b. However, the fixed lens 1b may have the IR-cut function and the covering function for foreign matter. In this case, the IR-cut filter of the glass plate is not necessarily provided, and, while there is an advantage of reducing the number of parts, there is disadvantages, for example, that formation of an IR-cut film on a curved surface is more difficult than that on a flat surface and that the influence of reflection of foreign matter is easily caused due to short distance between the foreign matter and the image sensor particularly in a vicinity of the center of an optical axis.

In the movable portion 4, the lens holding portion 4a and the side portion 4b are connected to be integrally formed, and the movable portion 4 has a substantially angled shape, in other words, an L-shape when viewed from a side. The side portion 4b is arranged at a side part (side surface) of the fixed lens 1b. By arranging the side portion 4b at the side part of the fixed lens 1b in this manner, while thickness of the lens holding portion 4a is kept to be thin, a part of the lens driving device, which includes the permanent magnet 7 and the coil 8 that require thickness in the optical axis direction, is arranged in the side portion 4b, so that it is possible to reduce thickness of the entirety of the module.

In the present embodiment, the permanent magnet 7 is fixed to the side portion 4b of the movable portion 4, and the coil 8 is fixed to the fixed portion 6 so as to be opposed thereto. Magnetic poles of the permanent magnet 7, which are on a side opposed to the coil 8, are two-pole magnetized so that polarities are different between an upper part and a lower part thereof. The coil 8 is wound in a substantially oval shape which is flat, and directions of an electric current in an upper path and a lower path are to be opposite, so that each part which is opposed to a different magnetic pole receives a force in the same direction. That is, when an electric current is applied to the coil 8, the permanent magnet 7 receives a force in the optical axis direction, and the movable portion 4 including the movable lens 1a is driven in the optical axis direction.

The balls 5 serving as guiding means are positioned between the movable portion 4 and the fixed portion 6. There are four balls 5 in total, one pair of which is arranged in the longitudinal direction as illustrated in FIG. 3 and one pair of which is arranged in a lateral direction as illustrated in FIG. 4. However, the number of balls 5 is not limited to four, and may be five or more, and may be three since a surface is determined with three points. Moreover, a guide shaft or the like may be used instead of the balls 5. As illustrated in FIG. 4, V-grooves 4c are formed in the side portion 4b of the movable portion 4 so as to guide a direction in which the balls 5 move, and, similarly, V-grooves 6a are formed in the fixed portion 6 so as to guide the balls 5 in the direction in which the balls 5 move. A case where the guides composed of the V-grooves 4c and the V-grooves 6a are provided at two positions arrayed in the lateral direction as illustrated in FIG. 4 is described in the present embodiment, but there is no limitation thereto. One guide may be used to determine the direction of the movement, and therefore a single guide may be provided at one of the positions. Moreover, in a case where the guide shaft is used instead of the balls 5, a hole serving as a bearing may be formed instead of the V-grooves 4c and 6a.

Note that, in the present embodiment, a magnetic body 13 is provided at a surface of the fixed portion 6, which is on a side closer to the permanent magnet 7. The movable portion 4 is attracted to the fixed portion 6 by an attraction force between the permanent magnet 7 and the magnetic body 13, and a contact pressure is able to be applied to the balls 5. Though the fixed portion 6 is mounted on the substrate 3 in the present embodiment, a width of the sensor cover 11 may be extended to a side of the fixed portion 6 and the fixed portion 6 may be mounted on the sensor cover 11.

Embodiment 2

Next, Embodiment 2 of the invention will be described on the basis of FIG. 5 and FIG. 6. The present embodiment is different from Embodiment 1 described above in that a part of a flange part of a fixed lens 1b' is subjected to D-cut and the part subjected to D-cut is arranged on a side closer to a driving portion (the permanent magnet 7 and the coil 8) of a lens driving device 9'. With such a configuration, it is possible to reduce a distance between the center of an optical axis and the driving portion (the permanent magnet 7 and the coil 8) of the lens driving device 9'. Other configurations are the same as those described in Embodiment 1. For convenience of description, members having the same functions as those of the members illustrated in the figures of Embodiment 1 above are denoted by the same reference signs, and description thereof will be omitted.

Figure 5:
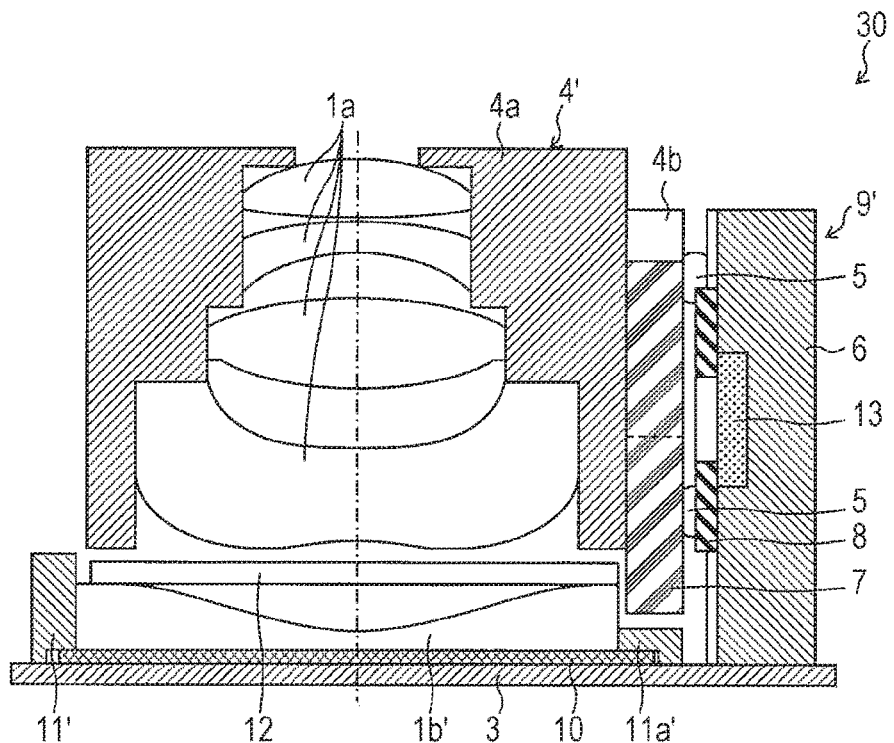
FIG. 5 is a sectional view illustrating a schematic configuration of a camera module according to another embodiment of the invention.
Figure 6:
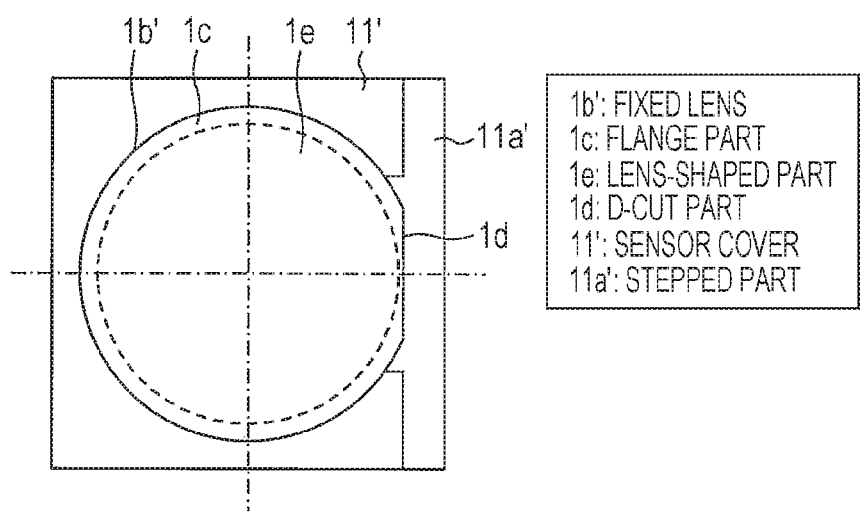
FIG. 6 is a plan view illustrating a schematic configuration of a fixed lens and a sensor cover of the camera module illustrated in FIG. 5.

FIG. 5 is a sectional view illustrating a schematic configuration of a camera module 30, and FIG. 6 is a plan view illustrating a schematic configuration of the fixed lens 1b' and a sensor cover 11' of the camera module 30 illustrated in FIG. 5.

As illustrated in FIG. 6, the fixed lens 1b' is constituted by a lens-shaped part 1e that is in the center part of the fixed lens 1b' and functions as a lens and a flange part 1c that is around the lens-shaped part 1e and functions as a frame of the lens-shaped part 1e. Note that, similarly to Embodiment 1 described above, the lens-shaped part 1e of the fixed lens 1b' has an upper surface which is a concave surface and a lower surface which is a flat surface. A part of the flange part 1c is subjected to D-cut linearly to form a D-cut part 1d, and the D-cut part 1d does not have a circular arc shape but is a flat surface.

As illustrated in FIG. 5, in the present embodiment, a stepped part 11a' is provided in the sensor cover 11' so as to correspond to the D-cut part 1d, and the permanent magnet 7 is arranged in a space which is formed as a result of such a configuration.

In this manner, by securing the space close to the fixed lens 1b' and arranging the permanent magnet 7 that is one part of the driving portion of the lens driving device 9' here, it is possible to allow a position, at which a driving force acts, to be closer to the center of the optical axis.

Normally, a gravity center position of a movable portion and an acting position of a force do not coincide with each other in a lens driving device having a structure as illustrated in FIG. 3 or FIG. 5. Since the longer the distance between the gravity center position of the movable portion and the acting position of the force becomes, the greater the moment becomes, it is desired to reduce the distance as much as possible. However, when a weight or the like is newly added as a balancer in order to make the gravity center position of the movable portion and the acting position of the force coincide with each other, weight of the movable portion is to be increased uselessly, which is undesirable. Accordingly, it is preferable to devise a good way in terms of a structure so that the gravity center position of the movable portion and the acting position of the force are able to be closer to each other. In order to reduce the distance, the present embodiment devises the way in which D-cut is performed for a part of the flange part 1c which does not function as a lens and the D-cut part 1d is arranged on a side of the driving portion (the permanent magnet 7 and the coil 8) of the lens driving device 9'.

Note that, in a case where the moment becomes great as described above, in a configuration as illustrated in FIG. 3 or FIG. 5, in which the balls 5 and the V-grooves are used to guide the balls 5 in the direction in which the balls 5 move, the moment acts in a direction that separates contact between the movable portion 4 and the balls 5, and therefore there is a possibility that it is not able to stably guide the balls 5. In addition, when the magnetic attraction force between the permanent magnet 7 and the magnetic body 13 is increased in order to prevent the movable portion 4 and the balls 5 from being separated, each contact pressure between the movable portion 4, the balls 5, and the fixed portion 6 is increased and friction becomes greater, so that there is a possibility of deteriorating smoothness of driving itself. Thus, it is preferable to reduce the distance between the gravity center position of the movable portion and the acting position of the force as much as possible and reduce the moment as in the present embodiment.

Note that, in a case of using a configuration in which a spring is used for support and which will be described below, when tilt becomes great due to the moment or servo control is performed, there is a possibility that resonance of a rotational motion is generated, which may prevent control. Accordingly, also in the case of using the configuration in which a spring is used for support, it is preferable to allow the gravity center position of the movable portion and the acting position of the force to be closer as much as possible similarly.

Embodiment 3

Next, Embodiment 3 of the invention will be described on the basis of FIG. 7. The present embodiment is different from Embodiments 1 and 2 described above in that a spring is used as a guide, by which the movable lens 1a is movable in an optical axis direction, instead of using the balls and the V-grooves. Other configurations are the same as those described in Embodiments 1 and 2. For convenience of description, members having the same functions as those of the members illustrated in the figures of Embodiments 1 and 2 above are denoted by the same reference signs, and description thereof will be omitted.

Figure 7:
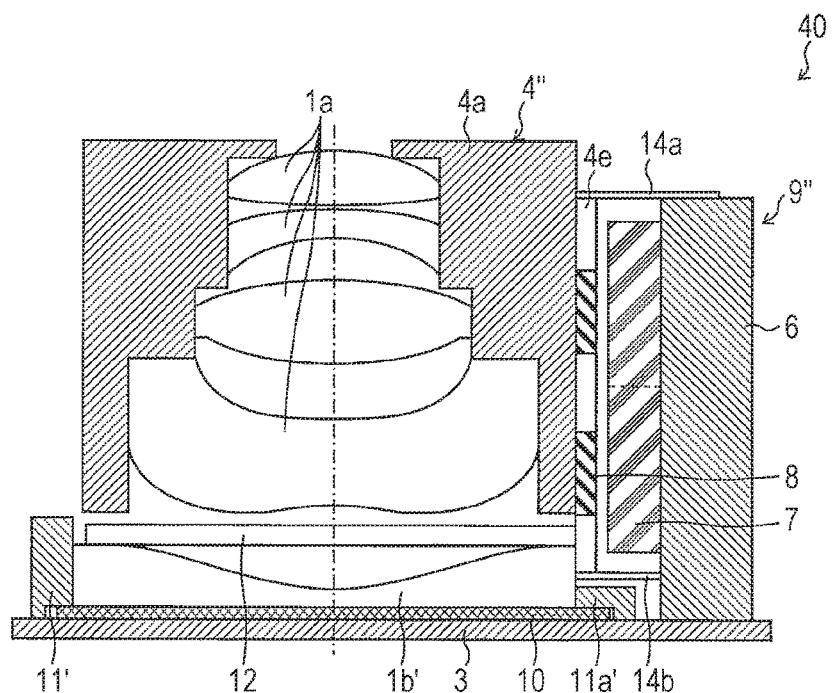
FIG. 7 is a sectional view illustrating a schematic configuration of a camera module according to still another embodiment of the invention.

FIG. 7 is a sectional view illustrating a schematic configuration of a camera module 40.

As illustrated in the figure, in the camera module 40, one ends of a pair of plate springs 14a and 14b are arranged on upper and lower surfaces of a side portion 4e of a movable portion 4", and the other ends of the plate springs 14a and 14b are connected to the fixed portion 6 of a lens driving device 9'". In this manner, the movable portion 4" is supported by the plate springs 14a and 14b so as to be movable in the optical axis direction. Note that, elastic bodies such as a metal spring is able to be used as the plate springs 14a and 14b, for example.

With a configuration in which the plate springs 14a and 14b are used as in the present embodiment, there is an advantage that an influence of friction is eliminated compared with a configuration in which balls and V-grooves are used as cases of Embodiments 1 and 2 described above.

Accordingly, it is not likely to be affected by a difference between the gravity center position of the movable portion and the acting position of the force, which is described above. However, tilt is caused to be generated depending on a magnitude of a spring constant, or in a case where servo control is performed, resonance of a rotation mode causes a problem in some cases, so that it is necessary to pay attention to designing a spring constant.

Note that, in the present embodiment, the coil 8 and the permanent magnet 7 are fixed to a side of the movable portion 4" and a side of the fixed portion 6, respectively, as illustrated in the figure. This is because, since the movable portion 4" is supported by using the plate springs 14a and 14b in the camera module 40 of the present embodiment, it is not necessary to obtain a contact pressure for balls by using a magnetic attraction force as Embodiments 1 and 2 described above, and it is possible to achieve reduction in weight of the movable portion 4" more easily by mounting the coil 8 on the side of the movable portion 4" compared to mounting the permanent magnet 7 thereon. Moreover, since the plate springs 14a and 14b are plastically deformed easily, when the permanent magnet 7 is arranged on the side of the movable portion 4", there is also a possibility that the movable portion 4" is attracted by an external magnetic body and displaced and the plate springs 14a and 14b are deformed due to displacement which is more than needed.

Embodiment 4

Next, Embodiment 4 of the invention will be described on the basis of FIG. 8. The present embodiment is different from Embodiments 1 to 3 described above in that the fixed lens 1b' is not fixed to a sensor cover 11" but directly mounted on the image sensor 10. By directly mounting the fixed lens 1b' on the image sensor 10 in this manner, a gap between the fixed lens 1b' and the image sensor 10 is able to be almost zero, so that it is possible to achieve reduction in thickness of a camera module compared with a case where the gap is provided as in Embodiments 1 to 3 described above. Note that, it is not necessary for the whole of a surface on a side of a lower surface of the fixed lens 1b' to be in contact with the image sensor 10, and, for example, by providing protrusion having a height of about several tens of micrometers in a part of the fixed lens 1b' and making the protrusion in contact with a part of the image sensor 10, excluding a part of a light receiving surface thereof, a gap for an amount of a step may be provided between the light receiving surface and the fixed lens 1b'. With such a configuration, it is possible to prevent the light receiving surface from being damaged or from being deformed by a pressure. Other configurations are the same as those described in Embodiment 2. For convenience of description, members having the same functions as those of the members illustrated in the figures of Embodiment 2 above are denoted by the same reference signs, and description thereof will be omitted.

Figure 8:
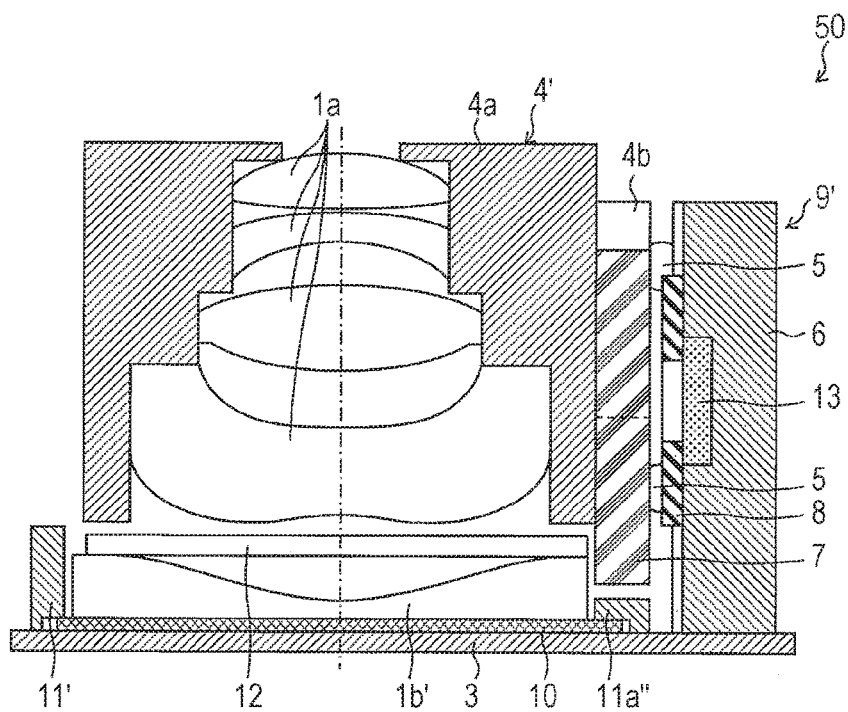
FIG. 8 is a sectional view illustrating a schematic configuration of a camera module according to still another embodiment of the invention.

FIG. 8 is a sectional view illustrating a schematic configuration of a camera module 50.

As illustrated in the figure, since the fixed lens 1b' is directly mounted on the image sensor 10, the sensor cover 11" does not need to have a function of supporting the fixed lens 1b', and only needs to have a covering function by which foreign matter is prevented from adhering to the image sensor 10.

In order to emphasize that the sensor cover 11" does not need the function of supporting the fixed lens 1b', a gap is formed between a side surface of the fixed lens 1b' and the sensor cover 11" (including a stepped part 11a") and is illustrated in FIG. 8, but such an obvious gap is not necessary actually, and the gap only needs to allow the fixed lens 1b' to be inserted up to a contact surface with the image sensor 10. Moreover, since the gap may cause a risk of adhesion of foreign matter to the image sensor 10, when the gap is generated, it is preferable to take a countermeasure, for example, by sealing the gap after attaching the fixed lens 1b'.

Embodiment 5

Next, Embodiment 5 of the invention will be described on the basis of FIG. 9. The present embodiment is different from Embodiments 1 to 4 described above in that the movable lens 1a is not directly inserted into and fixed to a movable portion 4''' of a lens driving device 9''' but the movable lens 1a is inserted into and fixed to a lens barrel 15 and the lens barrel 15 is inserted into the movable portion 4''' of the lens driving device 9''', and, at a time of being inserted, the lens barrel 15 is slidable inside the movable portion 4''', and when the lens barrel 15 is positioned inside the movable portion 4''', the lens barrel 15 is fixed to the movable portion 4''' with an adhesive 16. Other configurations are the same as those described in Embodiment 4. For convenience of description, members having the same functions as those of the members illustrated in the figure of Embodiment 4 above are denoted by the same reference signs, and description thereof will be omitted.

Figure 9:
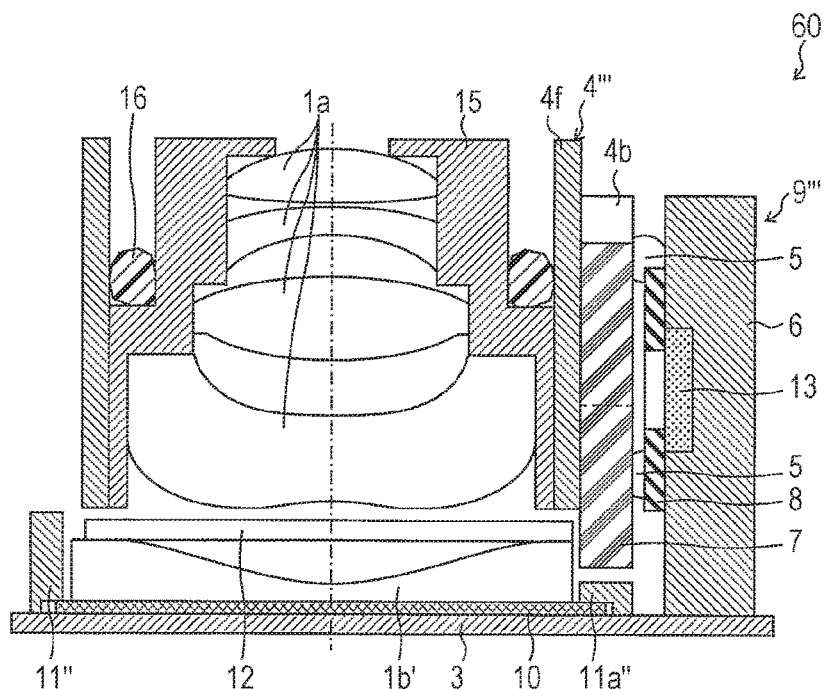
FIG. 9 is a sectional view illustrating a schematic configuration of a camera module according to still another embodiment of the invention.

FIG. 9 is a sectional view illustrating a schematic configuration of a camera module 60.

As illustrated in the figure, in the camera module 60, the movable portion 4''' is constituted by the side portion 4b and a lens holding portion 4f, and the lens barrel 15 is inserted into the movable portion 4''' of the lens driving device 9''', and, at the time of being inserted, the lens barrel 15 is slidable inside the movable portion 4'''. When a mounting position and parallelism of the movable lens 1a are able to be adjusted with use of the lens barrel 15, it is possible to adjust a mounting height and tilt of the movable lens 1a with respect to the image sensor 10 with high accuracy. For example, when the lens barrel 15 is fixed to the movable portion 4''' in a state where the lens barrel 15 is positioned with a bottom surface of the lens barrel 15 being in contact with an upper surface of the IR-cut filter 12 or a flange part of an upper surface of the fixed lens 1b', it is possible to adjust the position and tilt of the movable lens 1a with respect to the image sensor 10 with high accuracy.

As described in Embodiment 4, when the fixed lens 1b' is directly mounted on the image sensor 10 and the lens barrel 15 is directly mounted on the fixed lens 1b', it is possible to considerably enhance mounting accuracy of the movable lens 1a with respect to the image sensor 10 at least in a state where the lens driving device 9''' is not operated.

Embodiment 6

Next, Embodiment 6 of the invention will be described on the basis of FIG. 10 to FIG. 12. The present embodiment is different from Embodiments 1 to 5 described above in that a movable portion 4'''' whose shape is not formed in a substantially angled shape (L-shape) in side view but includes two side portions 4b at two surfaces of the lens holding portion 4a, which face each other, is used and a lens driving device 9'''' including two fixed portions 6 is used. Other configurations are the same as those described in Embodiments 1 to 5. For convenience of description, members having the same functions as those of the members illustrated in the figures of Embodiments 1 to 5 above are denoted by the same reference signs, and description thereof will be omitted.

Figure 10:
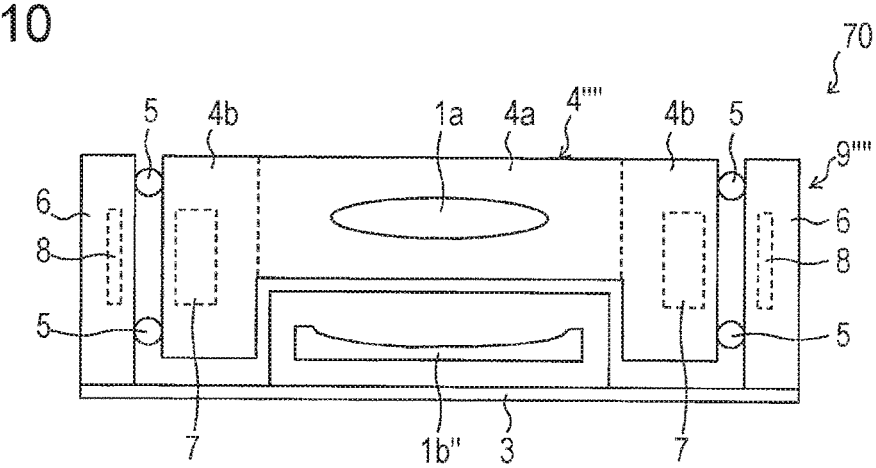
FIG. 10 is a schematic side view illustrating a schematic configuration of a camera module according to still another embodiment of the invention, which is provided with a lens driving device including two fixed portions.

FIG. 10 is a schematic side view illustrating a schematic configuration of a camera module 70 provided with the lens driving device 9'''' including the two fixed portions 6.

As illustrated in the figure, in the camera module 70, the movable portion 4'''' whose shape includes the two side portions 4b at the two surfaces of the lens holding portion 4a, which face each other, is used, and the lens driving device 9'''' including the two fixed portions 6 which correspond to the two side portions 4b is provided.

In a case of a configuration in which a side portion and a fixed portion are provided in each of two directions of a movable portion in this manner, when a movable portion whose thickness around the center of an optical axis is thin is used, a disadvantage may be caused in terms of strength since heavy parts (weight of the movable portion itself and weight of a coil and the like) are arranged in both ends of the movable portion, but there is an advantage when a thrust and power consumption are taken into consideration. Thus, the number of side portions and the number of fixed portions which are arranged with respect to the movable portion may be decided in accordance with specifications of a camera module.

Figure 11:
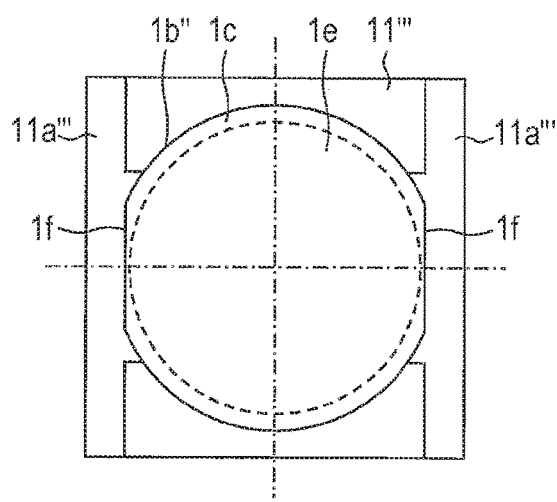
FIG. 11 is a plan view illustrating a schematic configuration of a fixed lens and a sensor cover of the camera module illustrated in FIG. 10.

FIG. 11 is a plan view illustrating a schematic configuration of a fixed lens 1b'' and a sensor cover 11''' in the camera module 70 illustrated in FIG. 10.

As illustrated in the figure, in order to reduce a distance between the center of an optical axis and a driving portion (the permanent magnet 7 and the coil 8) of the lens driving device 9'''', the fixed lens 1b'' having a shape in which the flange part 1c of the fixed lens 1b'' is linearly cut in two directions opposed to each other to form two I-cut parts 1f is used in the camera module 70. Note that, each of the I-cut parts 1f does not have a circular arc shape but is a flat surface.

Note that, in the sensor cover 11''' in the present embodiment, two stepped parts 11a''' are provided so as to correspond to the two I-cut parts 1f, and the permanent magnet 7 is arranged in a space generated by such a configuration.

In this manner, by securing the space close to the fixed lens 1b'' and arranging the permanent magnet 7 that is one part of the driving portion of the lens driving device 9'''' here, it is possible to allow a position, at which a driving force acts, to be closer to the center of the optical axis.

Note that, though description has been given in the present embodiment for a case where the side portion and the fixed portion are provided in each of the two directions in the movable portion, there is no limitation thereto, and a configuration in which a side portion and a fixed portion are provided in each of four directions in a movable portion may be provided in consideration of that a camera module becomes larger or the like.

Figure 12:
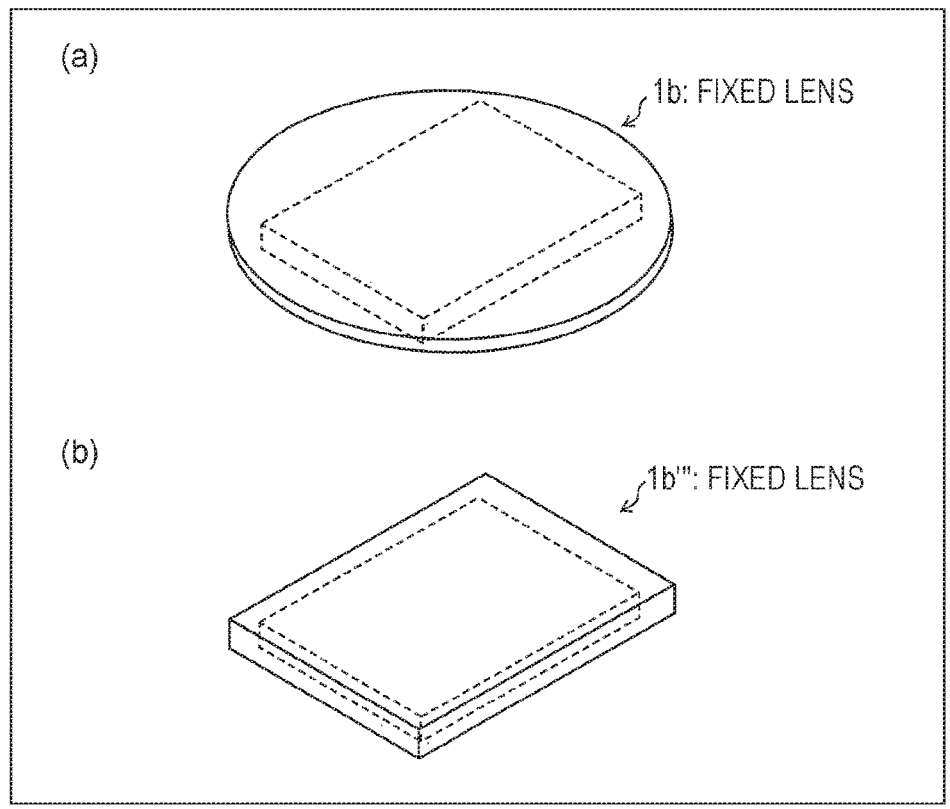
FIG. 12 is a view illustrating an example of another fixed lens that is able to be used in the camera module according to an embodiment of the invention.

FIG. 12 is a view illustrating examples of a fixed lens that is able to be used in the camera module of each of Embodiments of the invention.

FIG. 12(a) is a view schematically illustrating the fixed lens 1b that is used in Embodiment 1 described above and the like, and FIG. 12(b) is a view illustrating a fixed lens 1b''' that is able to be suitably used in the configuration in which a side portion and a fixed portion are provided in each of four directions in a movable portion.

As illustrated in FIG. 12(b), all flange parts of the fixed lens 1b''' are cut in the fixed lens 1b''', and thus the fixed lens 1b''' has a rectangular shape.

Embodiment 7

Next, Embodiment 7 of the invention will be described on the basis of FIG. 13 to FIG. 19. In the present embodiment, a lens driving device 9''''' provided in a camera module 80 includes not only an autofocus function but also an image stabilizer function, and the movable lens 1a of the imaging lenses 1 is able to be driven in three-axis directions in total, which include an optical axis direction and two directions perpendicular to the optical axis. Moreover, a fixed lens 1b'''' is directly mounted on the image sensor 10, and the lens driving device 9''''' is directly mounted on a stepped part of the fixed lens 1b''''. Furthermore, a part of a driving portion of the lens driving device 9''''' is arranged in a side part of the fixed lens 1b'''', and thereby reduction in thickness of the camera module is realized.

Figure 13:
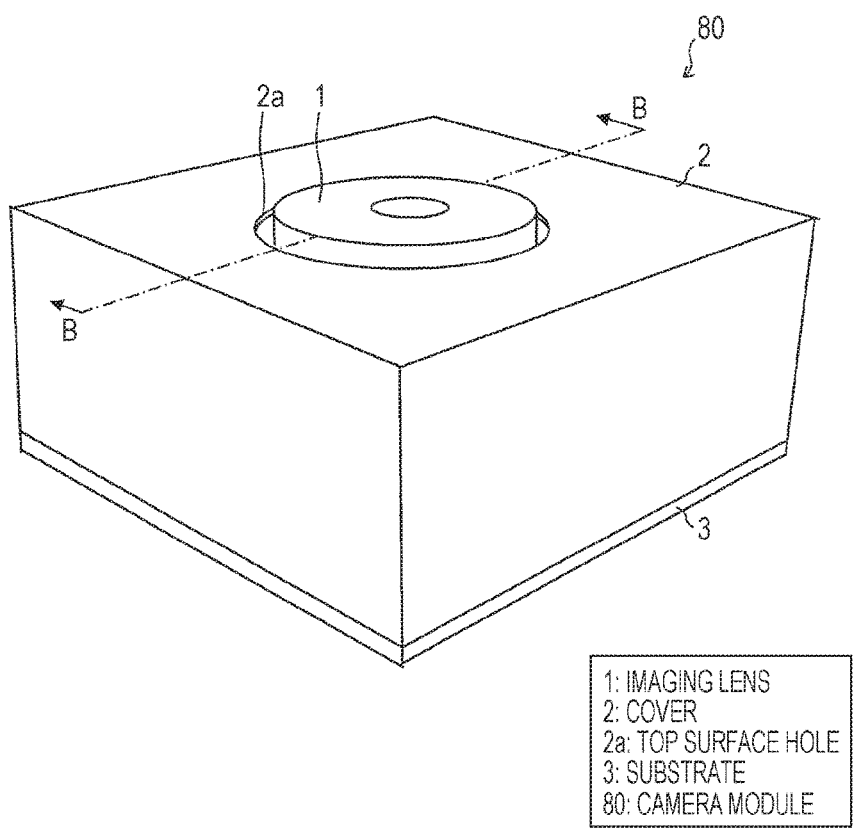
FIG. 13 is a perspective view illustrating a schematic configuration of a camera module according to still another embodiment of the invention.

FIG. 13 is a perspective view illustrating a schematic configuration of the camera module 80.

FIG. 13 illustrates the camera module 80 which includes the imaging lenses 1, the cover 2 that accommodates, in the inside thereof, the lens driving device, and the substrate 3. The camera module 80 is different from the camera module (refer to FIG. 1) in Embodiment 1 described above in that the imaging lenses 1 are arranged almost at the center of an external form of the cover 2 and in that a part of the imaging lenses 1 protrudes from a top surface hole 2a of the cover 2. The imaging lenses 1 are arranged almost at the center of the external form of the cover 2 in this manner, since it is necessary to symmetrically arrange a driving portion for image stabilization around the imaging lenses 1. The part of the imaging lenses 1 protrudes, since, for example, in a case where the camera module 80 is mounted on a mobile phone, thin packaging in a housing of the mobile phone is facilitated by reducing thickness of the camera module 80.

Figure 14:
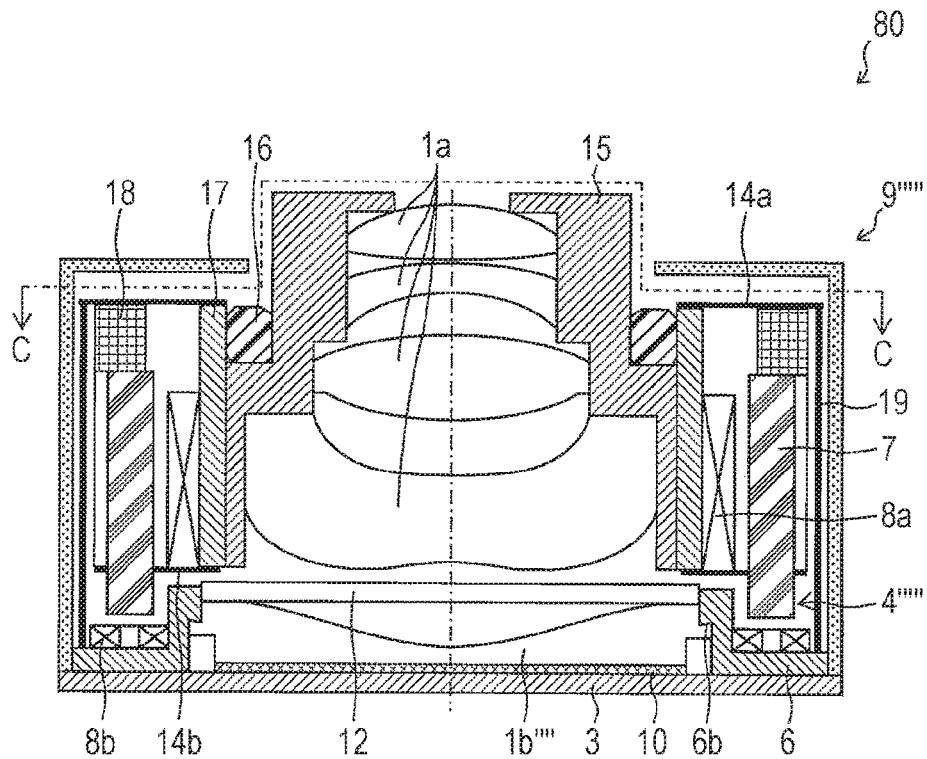
FIG. 14 is a sectional view taken along a B-B line illustrated in FIG. 13.
Figure 15:
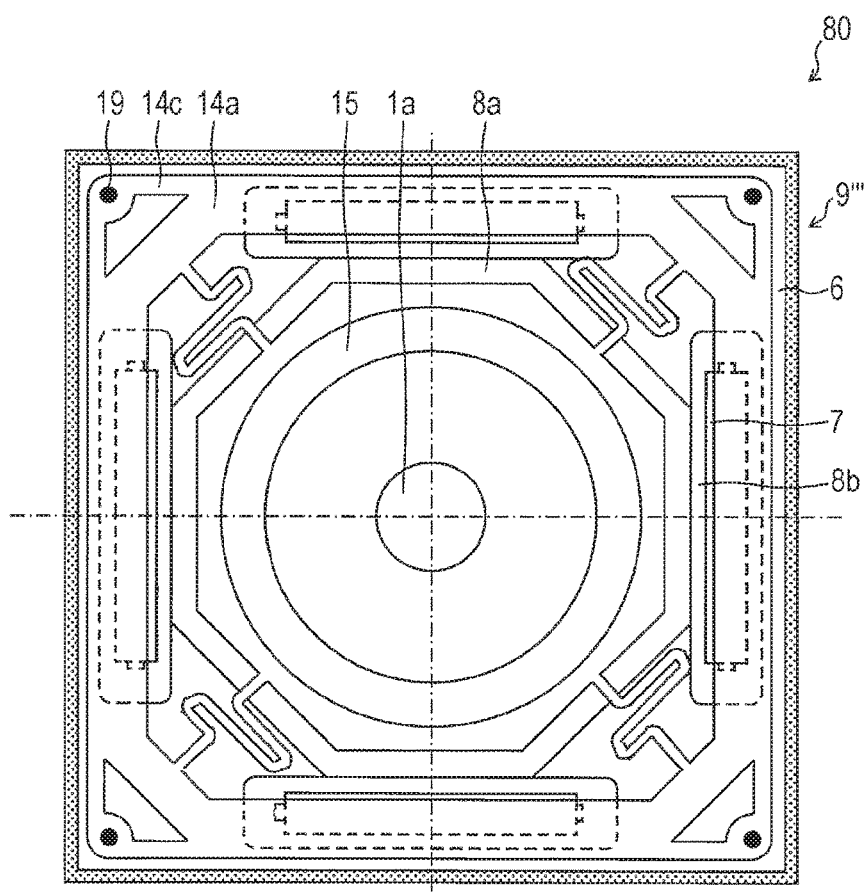
FIG. 15 is a sectional view of the camera module illustrated in FIG. 13, which is taken along a C-C line illustrated in FIG. 14.

FIG. 14 is a sectional view taken along a B-B line illustrated in FIG. 13, and FIG. 15 is a sectional view of the camera module illustrated in FIG. 13, which is taken along a C-C line illustrated in FIG. 14. As illustrated in the figure, the lens driving device 9''''' provided in the camera module 80 includes a movable portion 4''''' and the fixed portion 6, and the movable portion 4''''' includes an AF movable portion 17 that is driven for an autofocus operation and an OIS movable portion 18 that is driven for an image stabilization operation.

The lens barrel 15 that accommodates the movable lens 1a therein is fixed to an inside of the AF movable portion 17 with the adhesive 16. An AF coil 8a is wound around the AF movable portion 17. On the other hand, the permanent magnet 7 which is used for both of autofocus and image stabilization is fixed to the OIS movable portion 18. That is, in the camera module 80, both of the AF coil 8a and the permanent magnet 7 are included in the movable portion 4'''''.

The AF movable portion 17 is supported by the upper and lower plate springs 14a and 14b so as to be movable in an optical axis direction with respect to the OIS movable portion 18. On the other hand, as illustrated in FIG. 14 and FIG. 15, the OIS movable portion 18 is supported via an outside extending part 14c of the upper plate spring 14a and four suspension wires 19 so as to be movable in a direction perpendicular to the optical axis with respect to the fixed portion 6.

On the other hand, the OIS coil 8b is fixed to the fixed portion 6 so as to face the permanent magnet 7.

In such a configuration, when an electric current is applied to the AF coil 8a, the AF movable portion 17 is driven in the optical axis direction and the movable lens 1a is also driven in the optical axis direction. When an electric current is applied to the OIS coil 8*b*, the OIS movable portion 18 is driven in the direction perpendicular to the optical axis, and the movable lens 1*a* which is connected thereto by the upper and lower plate springs 14*a* and 14*b* is also driven in the direction perpendicular to the optical axis.

The upper plate spring 14*a* and the suspension wires 19 may be used for turning on electricity to the AF coil 8*a*. Note that, the AF coil 8*a* has two terminals, so that it is desirable that the upper plate spring 14*a* is electrically divided into two. Moreover, the camera module 80 may be provided with a Hall element as displacement detection means for controlling autofocus or image stabilization. Furthermore, by applying a gel material to the plate springs 14*a* and 14*b*, the suspension wires 19, or the movable portion 4'''' as necessary, a damping effect may be obtained.

As illustrated in FIG. 14, the image sensor 10 is mounted on the substrate 3, and the fixed lens 1*b*'''' is mounted thereon. Though not illustrated, it is desirable that protrusions each having a height of about several tens of micrometers are provided at least at three positions in a part of a bottom surface of the fixed lens 1*b*'''' and caused to be in contact with the image sensor 10 at positions other than a light receiving portion. In addition, an adhesive with which the fixed lens 1*b*'''' is fixed to the image sensor 10 or the substrate 3 is not applied to the contact parts and is not able to be applied to the light receiving portion of the image sensor 10, and therefore may be applied to an outer periphery of the fixed lens 1*b*'''' or the like.

The IR-cut filter 12 is provided on an upper surface of the fixed lens 1*b*''''. Moreover, a part of the fixed portion 6 of the lens driving device 9'''' is mounted on a stepped part on a side surface of the fixed lens 1*b*'''', and the lens driving device 9'''' is supported by the fixed lens 1*b*'''' via the fixed portion 6. In other words, the lens driving device 9'''' is mounted on the fixed lens 1*b*''''. Though the part of the fixed portion 6 of the lens driving device 9'''' may be provided on the IR-cut filter 12, it is possible to realize a camera module with higher accuracy by directly mounting the part on the stepped part of the fixed lens 1*b*''''.

That is, when the lens barrel 15 is positioned and fixed to the AF movable portion 17, positioning and tilt adjustment for the lens barrel 15 may be performed by using a jig or the like with a mounting surface 6*b* of the fixed portion 6 of the lens driving device 9'''' to the stepped part of the fixed lens 1*b*'''' (the mounting surface 6*b* is a surface of the fixed portion 6, which is in contact with the stepped part of the fixed lens 1*b*'''') as a reference surface. Thereby, with respect to the mounting surface 6*b*, the lens barrel 15 is positioned with high accuracy and fixed with a small tilt, so that it is possible to mount the movable lens 1*a* with high accuracy with respect to the image sensor 10 and the fixed lens 1*b*'''' fixed thereto in a contact manner.

As described above, since the fixed portion 6 of the lens driving device 9'''' is mounted on the stepped part of the fixed lens 1*b*'''', a slight gap may be provided between a part of the fixed portion 6 of the lens driving device 9'''', which is not in contact with the stepped part of the fixed lens 1*b*'''' and faces the substrate 3, and the substrate 3, and the gap may be filled with an adhesive.

Figure 16:
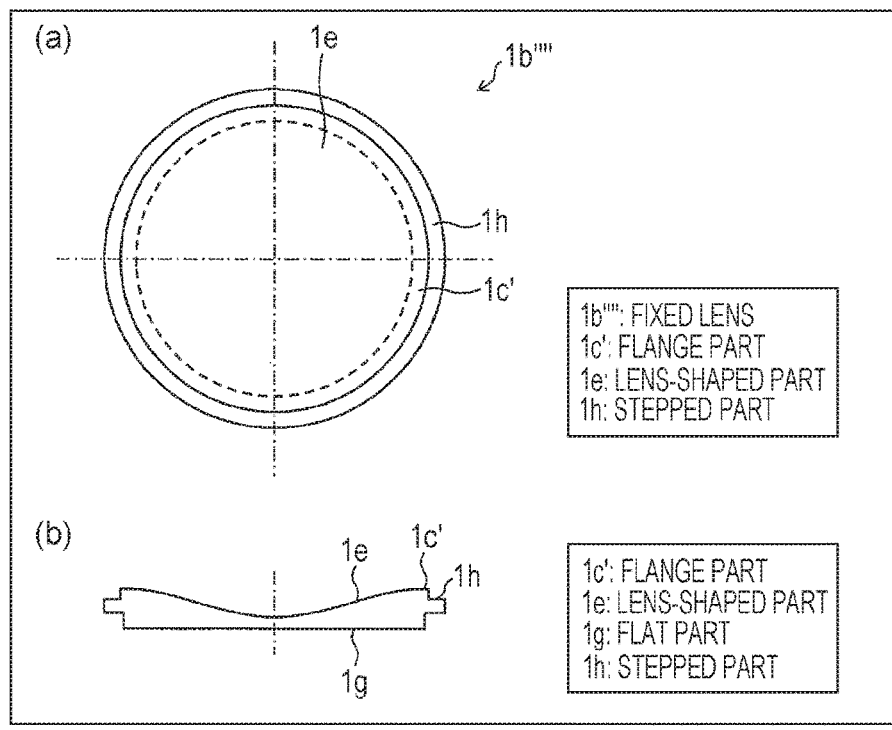
FIG. 16 is a view illustrating an example of a fixed lens used in the camera module illustrated in FIG. 13, in which (a) is a top view and (b) is a central sectional view.

FIG. 16 is a view illustrating an example of a shape of the fixed lens that is able to be used in the present embodiment, in which (a) is a plan view and (b) is a sectional view of a center part.

As already described also in other Embodiments, the fixed lens 1*b*'''' is composed of the lens-shaped part 1*e* that functions as a lens in the center thereof and a flange part 1*c*' that is around the lens-shaped part 1*e* and functions as a frame of the lens-shaped part 1*e*. The lens-shaped part 1*e* of the fixed lens 1*b*'''' has an upper surface which is a concave surface and a lower surface which is a flat surface 1*g* that is almost flat. Note that, as described above, a minute protrusion, which is not illustrated, may be provided on the lower surface to be used as a mounting surface to the image sensor.

Note that, the IR-cut filter is fixed to the flat flange part 1*c*' which is around an upper surface of the lens-shaped part 1*e* of the fixed lens 1*b*''''. A stepped part 1*h* is provided in an outside of the flat flange part 1*c*', the fixed portion 6 of the lens driving device 9'''' is fit to the stepped part 1*h*, and thereby the lens driving device 9'''' is able to be mounted on the fixed lens 1*b*''''.

Figure 17:
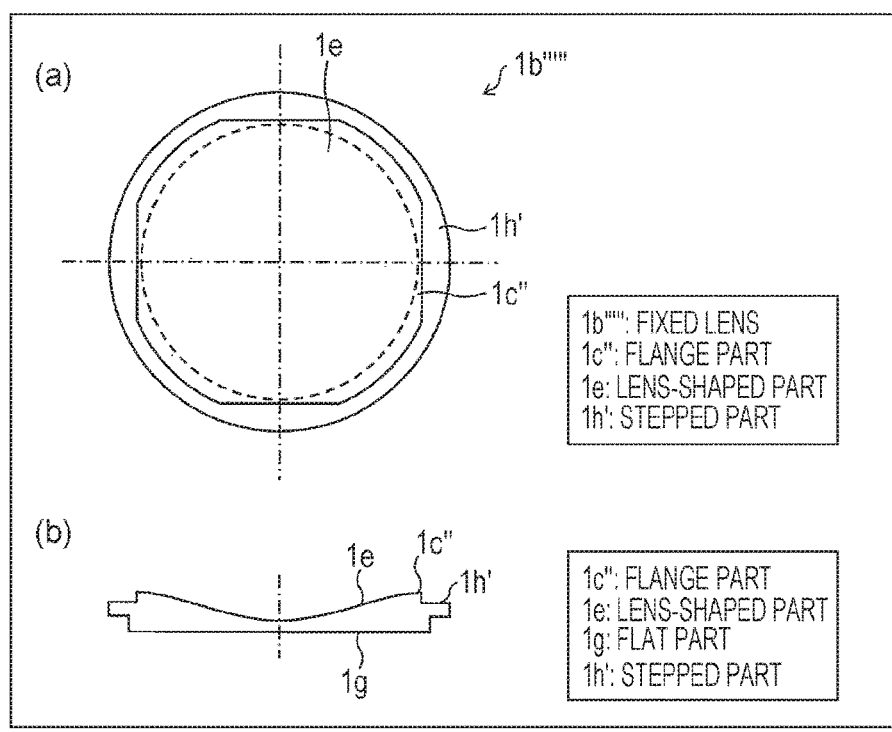
FIG. 17 is a view illustrating an another example of a fixed lens which is able to be used in the camera module illustrated in FIG. 13, in which (a) is a top view and (b) is a central sectional view.

FIG. 17 is a view illustrating a shape of another fixed lens which is able to be used in the present embodiment, in which (a) is a plan view and (b) is a sectional view of a center part.

A shape of a fixed lens 1*b*'''' illustrated in FIG. 17 is different from the shape of the fixed lens 1*b*'''' illustrated in FIG. 16 in that an area of each of stepped parts 1*h*' at four positions in an upper side, a lower side, a right side, and a left side is increased by linearly cutting a part of a flange part 1*c*'', for example, in the present embodiment, by linearly cutting two positions in the upper side and the lower side, which are opposed to each other, and two positions in the right side and the left side, which are opposed to each other, as illustrated in FIG. 17(*a*). This makes it easy to mount the lens driving device 9'''', and makes it possible to allow a contact part of a side of the lens driving device 9'''' to be closer to an inner periphery, so that it becomes possible to enhance a degree of freedom of designing a camera module.

Though description has been given so far by taking, as an example, the camera module 80 including the lens driving device 9'''' in which the permanent magnet 7 and the OIS coil 8*b* are arranged in each of four sides, the permanent magnet 7 and the OIS coil 8*b* may be arranged not in each of the four sides but in each of four corners.

Figure 18:
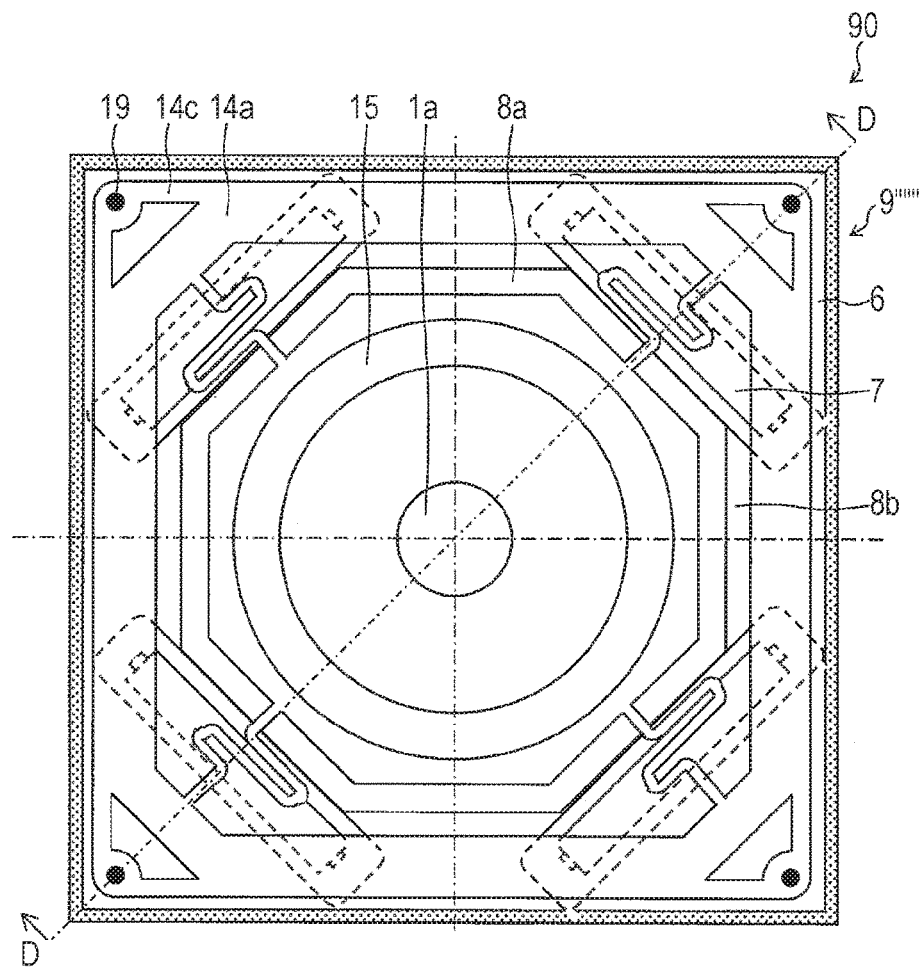
FIG. 18 is a sectional view illustrating a schematic configuration of a camera module according to still another embodiment of the invention, which is a modified example of the camera module illustrated in FIG. 15.
Figure 19:
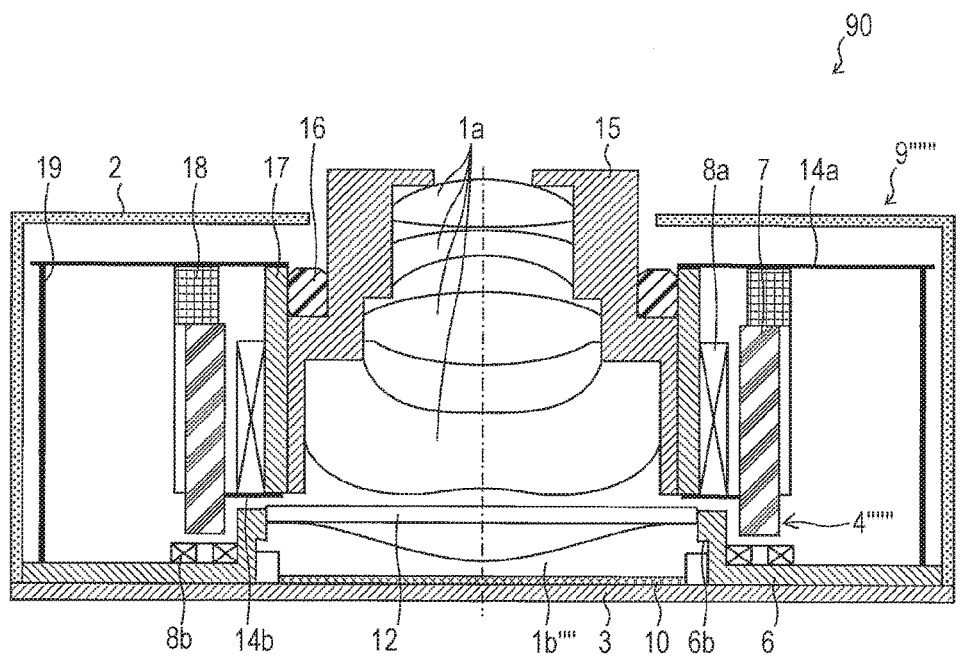
FIG. 19 is a sectional view taken along a D-D line illustrated in FIG. 18.

FIG. 18 is a sectional view illustrating a schematic configuration of a camera module 90 including a lens driving device 9'''' in which the permanent magnet 7 and the OIS coil 8*b* are arranged in each of four corners, and FIG. 19 is a sectional view taken along a D-D line illustrated in FIG. 18.

As illustrated in the figure, in the camera module 90, the permanent magnet 7 and the OIS coil 8*b* are arranged not in each of four sides but in each of the four corners, and arrangement of the permanent magnets 7 and the OIS coils 8*b* is different from that of the camera module 80, but other functions and the like are equivalent to those of the camera module 80.

CONCLUSION

A camera module in an aspect 1 of the invention is a camera module, including: imaging lenses; a lens driving device that drives the imaging lenses; and an image sensor that converts light entering the image sensor via the imaging lenses into an electrical signal, in which the imaging lenses include at least a movable lens that is driven for autofocus and a fixed lens that is not driven, the lens driving device includes a movable portion including the movable lens and a fixed portion that drives the movable portion including the movable lens, the movable portion has a shape that covers an upper side of the fixed lens and at least a part of a side surface of the fixed lens, and at least a part of the fixed portion is provided in the side surface of the fixed lens.

With the aforementioned configuration, the movable portion of the lens driving device has the shape that covers the upper side of the fixed lens and at least a part of the side surface of the fixed lens, and at least a part of the fixed portion of the lens driving device is provided at the side surface of the fixed lens, so that it is possible to realize a small-sized and thin camera module. Moreover, since the configuration includes the movable lens and the fixed lens, even in a case where, in order to obtain high resolution, the number of pixels is increased and a diameter of an imaging lens becomes larger, driving is able to be performed with low power consumption.

In a camera module in an aspect 2 of the invention, it is preferable that the movable portion is formed in an angled shape in side view, and the movable portion is arranged on the upper side of the fixed lens and at one side surface of the fixed lens.

With the aforementioned configuration, it is possible to realize a camera module having a high strength and which is smaller.

In a camera module in an aspect 3 of the invention, it is preferable that one of a coil and a permanent magnet is included in the fixed portion, the other of the coil and the permanent magnet is included in the movable portion, and at least one of the coil and the permanent magnet is provided at a side surface of the fixed lens.

With the aforementioned configuration, it is possible to arrange a driving portion, whose structure is simple and inexpensive and which is highly reliable, in a limited space.

In a camera module in an aspect 4 of the invention, the movable portion may be driven also in a direction perpendicular to an optical axis of the imaging lenses.

With the aforementioned configuration, it is possible to realize a camera module which also includes an image stabilizer function and is small-sized and thin. Moreover, since the configuration includes the movable lens and the fixed lens, even in a case where, in order to obtain high resolution, the number of pixels is increased and a diameter of an imaging lens becomes larger, driving is able to be performed with low power consumption.

In a camera module in an aspect 5 of the invention, it is preferable that at least a part of a driving portion that drives the movable portion in the direction perpendicular to the optical axis of the imaging lenses is provided at a side surface of the fixed lens.

With the aforementioned configuration, it is possible to particularly realize reduction in thickness of a camera module, while securing a necessary height of a lens driving device.

In a camera module in an aspect 6 of the invention, it is preferable that the fixed lens has a concave surface on an object side and a substantially flat surface on an image surface side that faces the image sensor.

With the aforementioned configuration, since it is possible to arrange the fixed lens in proximity to the image sensor, even when reduction in height of the camera module is attempted by designing a lens having an wide angle and thereby reducing a focal distance and an optical length, it is possible to effectively correct an aberration, thus making it possible to prevent imaging performance from being deteriorated, specifically, resolution from being deteriorated due to widening the angle.

Moreover, by using the fixed lens having the concave surface on the object side and the substantially flat surface on the image surface side that faces the image sensor, it is facilitated to secure the performance even in the case of thinning an entirety of an optical system of the camera module. However, when the thickness of an entirety of the movable lens is also thinned in order to reduce the thickness of the camera module, it becomes necessary to constitute the lens driving device so as to have thickness equivalent to that of the movable lens. In such a case, the movable portion of the lens driving device, which has the shape that covers the upper side of the fixed lens and at least a part of the side surface of the fixed lens, is more effective for realizing a small-sized and thin camera module.

In a camera module in an aspect 7 of the invention, it is preferable that the fixed lens has a lens-shaped part in a center part and a flange part around the lens-shaped part, and at least a part of the flange part, where the fixed portion of the lens driving device is arranged, is linearly cut.

With the aforementioned configuration, since a part of the flange part, which does not function as a lens, is linearly cut, the fixed portion of the lens driving device is able to be arranged in the cut part, so that it is possible to allow a gravity center position of the movable portion and an acting position of a force to be closer to each other and reduce the moment generated around the center of an optical axis.

In a camera module in an aspect 8 of the invention, it is preferable that at least a part of the surface of the fixed lens, which faces the image sensor, is mounted above the image sensor.

With the aforementioned configuration, by directly mounting the fixed lens on the image sensor, it is possible to make a gap between the fixed lens and the image sensor almost zero, thus making it possible to realize a camera module whose thickness is further reduced.

In a camera module in an aspect 9 of the invention, it is preferable that the lens driving device is mounted on the fixed lens via the fixed portion.

With the aforementioned configuration, it is possible to realize a camera module in which positional relationships between the image sensor, the fixed lens, and the movable lens are set with high accuracy.

In a camera module in an aspect 10 of the invention, it is preferable that a sensor cover that covers the image sensor is provided, and the fixed lens is fixed to the sensor cover.

With the aforementioned configuration, since the fixed lens is fixed to the sensor cover, there is a slight gap between the fixed lens and the image sensor. With such a configuration, even in a case where the image sensor is curved, the fixed lens is able to be fixed without being affected by the curve, so that it is possible to reduce optical tilt.

In a camera module in an aspect 11 of the invention, it is preferable that an IR-cut filter is provided between the movable lens and the fixed lens.

With the aforementioned configuration, since the fixed lens is arranged in a space between the IR-cut filter and the image sensor, it is possible to effectively utilize the space and increase a distance between the image sensor and the IR-cut filter, thus making it possible to reduce an optical influence of foreign matter dropped on the IR-cut filter.

In a camera module in an aspect 12 of the invention, guide members may be provided between the movable portion and the fixed portion, and the guide members may be composed of a ball and grooves or holes which are formed in the movable portion and the fixed portion.

With the aforementioned configuration, it is possible to comparatively easily guide the movable portion with respect to the fixed portion.

In a camera module in an aspect 13 of the invention, a guide member may be provided between the movable portion and the fixed portion, and the guide member may be an elastic body.

With the aforementioned configuration, since an influence of friction that may be caused in a case where a ball and grooves are used is eliminated, it is not likely to be affected by a difference between the gravity center position of the movable portion and the acting position of the force.

Note that, the invention is not limited to each of the embodiments described above, and may be modified in various manners within the scope of the claims and an embodiment achieved by appropriately combining technical means disclosed in each of different embodiments is also encompassed in the technical scope of the invention.

INDUSTRIAL APPLICABILITY

The invention is able to be suitably used for a camera module that is mounted on various electronic apparatuses including communication apparatuses such as a mobile terminal.

REFERENCE SIGNS LIST 1 imaging lens
1a movable lens
1b fixed lens
1b' fixed lens
1b" fixed lens
1b'" fixed lens
1b"" fixed lens
1b""' fixed lens
1c flange part
1c' flange part
1c" flange part
1d D-cut part
1e lens-shaped part
1f I-cut part
1g flat part
1h stepped part
1h' stepped part
2 cover
2a top surface hole
3 substrate
4 movable portion
4' movable portion
4" movable portion
4'" movable portion
4"" movable portion
4""' movable portion
4""'' movable portion
4a lens holding portion
4b side portion
4c V-groove (guide member)
4e side portion
4f lens holding portion
5 ball (guide member)
6 fixed portion
6a V-groove (guide member)
6b mounting surface
7 permanent magnet
8 coil
8a AF coil
8b OIS coil
9 lens driving device
9' lens driving device
9" lens driving device
9'" lens driving device
9"" lens driving device
9""' lens driving device
9""'' lens driving device
10 image sensor
11 sensor cover
11' sensor cover
11a' stepped part
11" sensor cover
11a" stepped part
11'" sensor cover
11a'" stepped part
12 IR-cut filter
13 magnetic body
14a plate spring (guide member)
14b plate spring (guide member)
14c extending part
15 lens barrel
16 adhesive
17 AF movable portion
18 OIS movable portion
19 suspension wire
20 camera module
30 camera module
40 camera module
50 camera module
60 camera module
70 camera module
80 camera module
90 camera module

The invention claimed is:

1. A camera module, comprising:
imaging lenses;
a lens driving device that drives the imaging lenses; and
an image sensor that converts light entering the image sensor via the imaging lenses into an electrical signal, wherein
the imaging lenses include at least a movable lens that is driven to autofocus and a fixed lens that is not driven,
the fixed lens is arranged under the movable lens and on a side closer to the image sensor than the movable lens,
the lens driving device includes a movable portion including the movable lens and a fixed portion that drives the movable portion including the movable lens,
the movable portion has a shape that covers an upper side of the fixed lens and at least a portion of a side surface of the fixed lens,
the movable portion is defined in an "L" shape or substantially in an "L" shape in a side view,
the movable portion is arranged on the upper side of the fixed lens and at the side surface of the fixed lens, and
at least a portion of the fixed portion is provided at the side surface of the fixed lens.

2. The camera module according to claim 1, wherein
one of a coil and a permanent magnet is included in the fixed portion,
the other of the coil and the permanent magnet is included in the movable portion, and
at least one of the coil and the permanent magnet is provided at the side surface of the fixed lens.

3. The camera module according to claim 1, wherein the movable portion is driven also in a direction perpendicular to an optical axis of the imaging lenses.

4. The camera module according to claim 3, wherein at least a portion of a driving portion that drives the movable portion in the direction perpendicular to the optical axis of the imaging lenses is provided at the side surface of the fixed lens.

5. The camera module according to claim 1, wherein the fixed lens has a concave surface on an object side and a substantially flat surface on an image surface side that faces the image sensor.

6. The camera module according to claim 1, wherein
the fixed lens has a lens-shaped portion in a center portion and a flange portion around the lens-shaped portion, and
at least a portion of the flange portion, where the fixed portion of the lens driving device is arranged, is linearly cut.

7. The camera module according to claim 1, wherein at least a portion of a surface of the fixed lens that faces the image sensor, is mounted above the image sensor.

8. The camera module according to claim 1, wherein the lens driving device is mounted on the fixed lens via the fixed portion.

* * * * *